United States Patent
Lin et al.

(10) Patent No.: US 10,660,005 B1
(45) Date of Patent: May 19, 2020

(54) CELLULAR NETWORK HANDOFF PLANNING

(71) Applicant: International Business Machines Corporation, Armonk, NY (US)

(72) Inventors: Ho Leung Lin, Brossard (CA); Gregory J. Boss, Saginaw, MI (US); Maharaj Mukherjee, Poughkeepsie, NY (US); Monimala Mukherjee, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/202,372

(22) Filed: Nov. 28, 2018

(51) Int. Cl.
  *H04W 36/24* (2009.01)
  *H04W 64/00* (2009.01)
  *H04W 36/00* (2009.01)
  *H04W 36/32* (2009.01)

(52) U.S. Cl.
  CPC ... *H04W 36/245* (2013.01); *H04W 36/00837* (2018.08); *H04W 64/006* (2013.01); *H04W 36/32* (2013.01)

(58) Field of Classification Search
  CPC ... H04W 36/245; H04W 64/006; H04W 4/02; H04W 36/32; H04W 36/0016; H04W 36/0083; H04W 36/00835; H04W 36/00837; H04W 36/38
  See application file for complete search history.

(56) References Cited

U.S. PATENT DOCUMENTS

| | | | |
|---|---|---|---|
| 6,119,005 A | 9/2000 | Smolik | |
| 6,711,408 B1* | 3/2004 | Raith | H04W 36/32 340/988 |
| 8,559,955 B2 | 10/2013 | Handforth et al. | |
| 8,605,683 B2* | 12/2013 | Garcia Martin | H04W 36/32 370/236 |
| 9,378,602 B2 | 6/2016 | Ricci et al. | |
| 2009/0203394 A1* | 8/2009 | Shaffer | H04W 36/32 455/525 |
| 2010/0304756 A1* | 12/2010 | Yang | H04W 64/00 455/456.1 |
| 2010/0323715 A1 | 12/2010 | Winters | |
| 2011/0219226 A1* | 9/2011 | Olsson | G06F 21/6245 713/150 |
| 2012/0190334 A1* | 7/2012 | Li | G06F 21/31 455/411 |

(Continued)

OTHER PUBLICATIONS

Castro-Hernandez et al. "Planning and Optimization of Cellular Heterogeneous Networks" A Thesis Submitted to the Faculty of Graduate Studies and Research in Partial Fulfillment of the Requirements for the Degree of Doctor of Philosophy in Electronic Systems Engineering University of Regina. Dec. 2016. Two hundred fifteen pages.

Mishra, S. et al.; "Load Balancing Optimization in LTE/LTE-A Cellular Networks: A Review". >https://arxiv.org/search/?query=Load+Balancing+Optimization+in+LTE/LTE-A+Cellular+Networks:+A+Review&searchtype=all&source=header>. Dec. 23, 2014. Eight pages.

(Continued)

*Primary Examiner* — Magdi Elhag
(74) *Attorney, Agent, or Firm* — Stephen L. Carusillo

(57) ABSTRACT

Planning cell site handoffs using a navigation route. The navigation route is compared to the location of cell sites to predict the arrival time of a mobile device into each cell. Cell sites are selected based on the navigation route and user activity. Handoff between cells sites are scheduled in advance based on the navigation route.

18 Claims, 5 Drawing Sheets

(56) References Cited

U.S. PATENT DOCUMENTS

| | | | |
|---|---|---|---|
| 2012/0258717 A1* | 10/2012 | Handforth | H04W 36/32 |
| | | | 455/436 |
| 2014/0213256 A1* | 7/2014 | Meylan | H04W 48/18 |
| | | | 455/436 |
| 2015/0012213 A1 | 1/2015 | Kwak et al. | |
| 2015/0036663 A1* | 2/2015 | Kilpatrick, II | H04W 36/245 |
| | | | 370/332 |
| 2015/0038140 A1* | 2/2015 | Kilpatrick, II | H04W 64/00 |
| | | | 455/436 |
| 2015/0195757 A1* | 7/2015 | Tietz | H04W 36/0061 |
| | | | 455/438 |
| 2016/0119845 A1* | 4/2016 | Lu | H04B 7/18506 |
| | | | 370/331 |
| 2017/0208540 A1* | 7/2017 | Egner | H04W 4/029 |
| 2018/0241463 A1* | 8/2018 | Lu | H04B 7/18506 |
| 2019/0053296 A1* | 2/2019 | Balappanavar | H04W 76/10 |

OTHER PUBLICATIONS

"A System and Method for Personal (Data Based) Navigation Recommender". IP.com No. IPCOM000244516D IP.com Electronic Publication Date: Dec. 17, 2015. Seven pages.

"Method of localized traffic monitoring using cellular tower data" An IP.com Prior Art Database Technical Disclosure. P.com No. IPCOM000223871D. IP.com Electronic Publication Date: Dec. 4, 2012. Six pages.

"System for gathering operational details augmented with GPS locations from mobile devices to improve navigation". IP.com No. IPCOM000201709D. IP.com Electronic Publication Date: Nov. 18, 2010. Four pages.

* cited by examiner

# CELLULAR NETWORK HANDOFF PLANNING

BACKGROUND OF THE INVENTION

The present invention relates generally to the field of cellular networking, and more particularly to cell handoffs.

In a cellular network system, a land area to be supplied with wireless network service is divided into cells. Each cell is serviced by a radio base station, known as a cell site. Neighboring cells sites are assigned different radio frequencies to reduce signal interference. As a transceiver moves from one cell to another, the transceiver must connect to the new cell site to maintain the connection. The transceiver must change from the frequency of the source cell site to the frequency of the target cell site. This process of disconnecting from the source cell site and connecting to the target cell site is known as a handoff.

SUMMARY

According to an aspect of the present invention, there is a method, computer program product, and/or system that performs the following steps (not necessarily in the following order): (i) receives a navigation route from a mobile device, wherein the navigation route indicates an intended path of travel; (ii) determines a carrier of the mobile device; (iii) determines a set of checkpoints based on the navigation route, wherein the set of checkpoints are intermediate locations between the start location and the destination; (iv) selects a plurality of cell sites servicing the set of checkpoints, wherein the plurality of cell sites are associated with the carrier; and (v) generates a handoff plan based on the plurality of cell sites.

According to an aspect of the present invention, there is a method, computer program product, and/or system for optimizing cell tower handoffs that performs the following steps (not necessarily in the following order): (i) receives an indication of a cell user's intended path of navigation; (ii) predicts an indication of a speed at which the cell user navigates the path; and (iii) recommends cell tower handoffs along the path based on the intended path and predicted speed of navigation.

DETAILED DESCRIPTION

Figure 1:
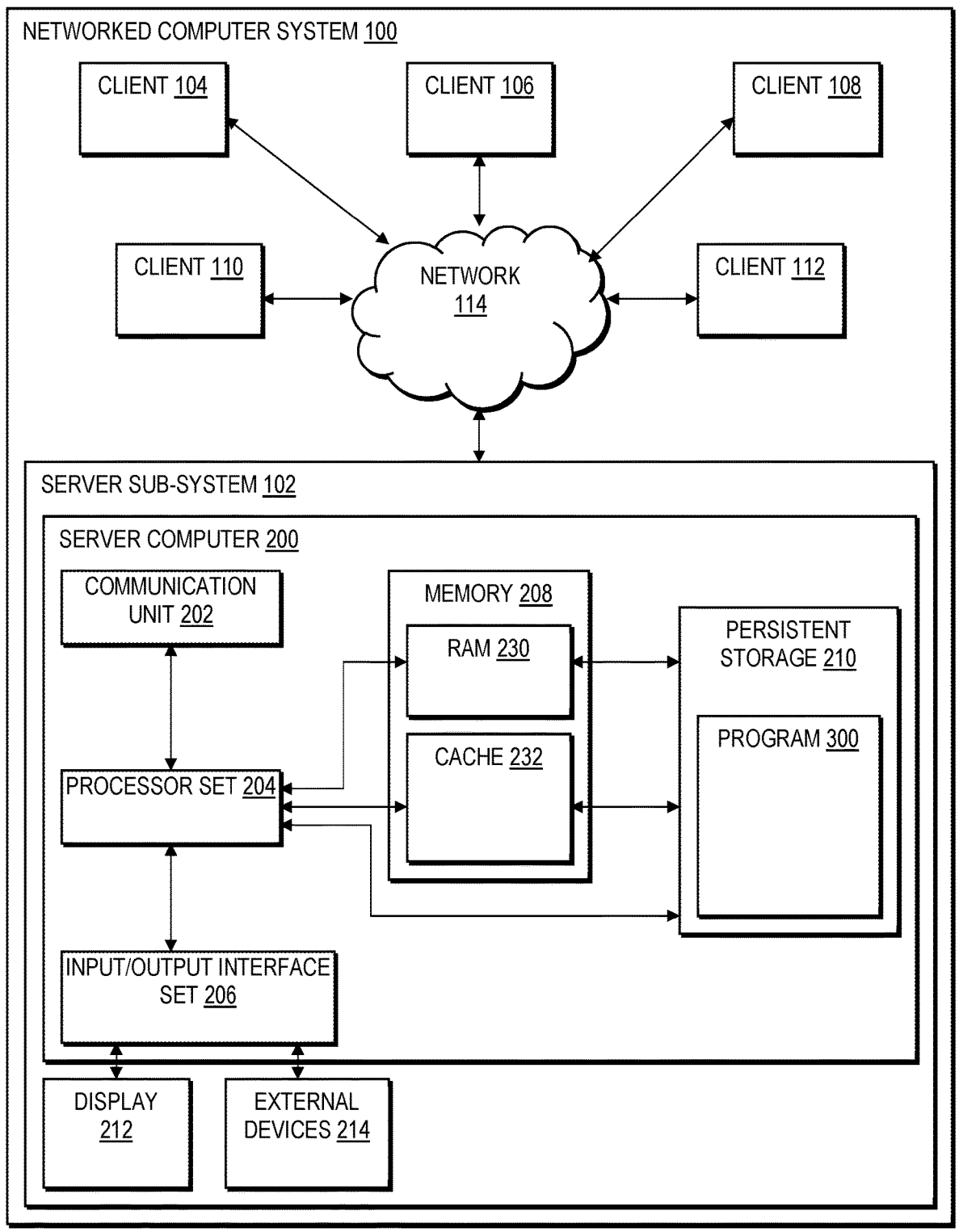
FIG. 1 is a block diagram view of a first embodiment of a system according to the present invention.

Planning cell site handoffs using a navigation route. The navigation route is compared to the location of cell sites to predict the arrival time of a mobile device into each cell. Cell sites are selected based on the navigation route and user activity. Handoff between cells sites are scheduled in advance based on the navigation route.

A system which integrates with a vehicles in-car navigation or a user's cell phone to receive a route navigation plan, forward that plan to a cell site control system. The control system then analyzes the route to determine which neighboring cell sites will be in transmission range at specific times through the route. The system also coordinates other drivers/users to optimize cell site handoffs.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Client sub-systems 102, 106, 108, 110, and 112 represent mobile devices and navigations systems connected to server sub-system 102 by communication network 114. Client sub-systems 102, 106, 108, 110, and 112 are devices with wireless communication capability and the capability to access navigation tools, such as the Global Positioning System (GPS). In some embodiments, Client sub-systems 102, 106, 108, 110, and 112 represent mobile devices, navigation devices, and cell sites.

Server sub-system 102 is, in many respects, representative of the various computer sub-system(s) in the present invention. Accordingly, several portions of sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210. Persistent storage 210 stores a database containing historic handoff information. The database may contain historic signal quality information, historic handoff location information, historic route information, and previously generated handoff plans.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Program 300 operates to determine a cell site handoff plan for a mobile device travelling along a predetermined route. Program 300 receives a planned travel route, determines a wireless carrier, determines cell sites, also referred to a cell towers, along the planned route, determines checkpoints along the route, selects cell sites, generates a cell site handoff plan, and updates the cell site handoff plan based on identified deviations from the planned travel route.

Figure 2:
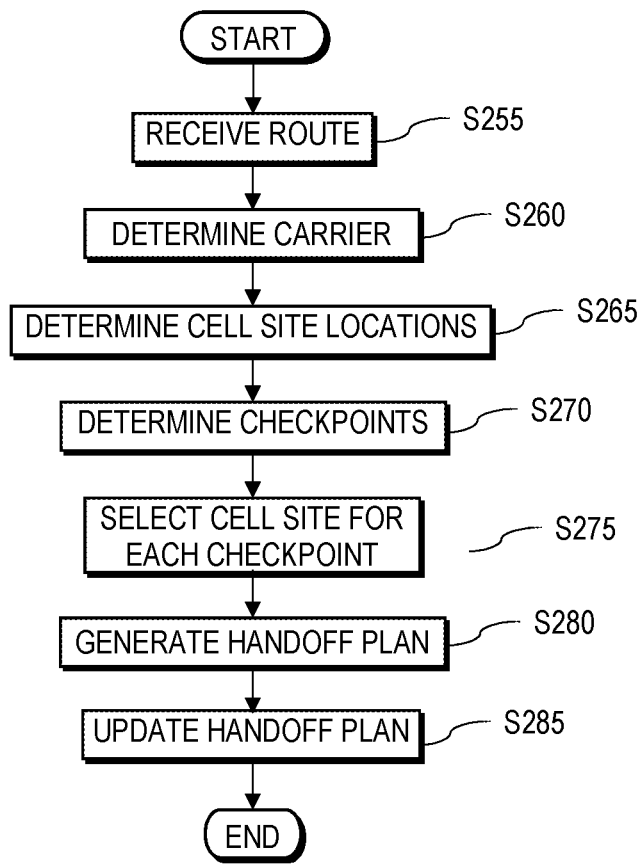
FIG. 2 is a flowchart showing a first embodiment method performed, at least in part, by the first embodiment system.
Figure 3:
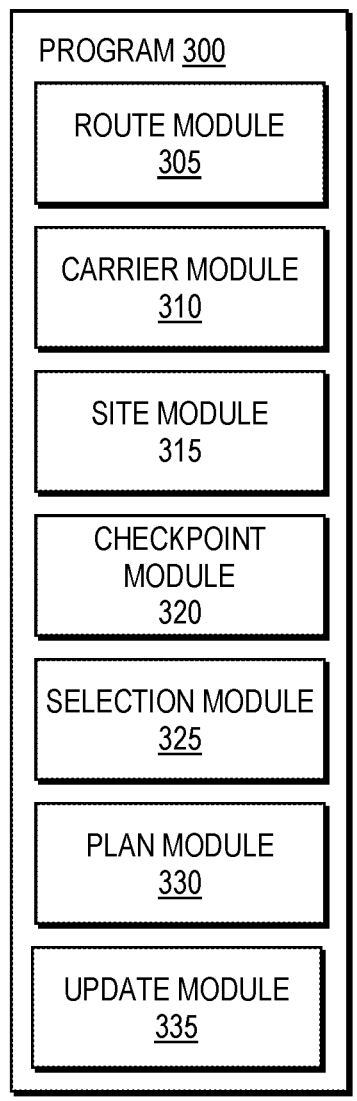
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where route module ("mod") 305 receives a navigation route from a mobile device, such a client 104. In this embodiment, route mod 305 receives planned route information from a mobile device having navigation software. For example, the mobile device may utilize GPS, cell site triangulation, or a combination of both. The mobile device communicates the navigation route provided by the navigation software to route mod 305. For example, route mod 305 may receive start and end points, road segments, driving maneuvers, departure time, predicted arrival time, and/or traffic information from the mobile device, depending on the capabilities of the navigation software. Alternatively, the mobile device is a stand-alone navigation system and communicates directly with route mod 305. According to some embodiments of the present invention, a user initiates communication with route mod 305 and authorizes communication between the navigation software and route mod 305.

Processing proceeds to step S260, where carrier mod 310 determines the wireless carrier associated with the mobile device. In this embodiment, carrier mod 310 queries the mobile device for the associated wireless carrier, and carrier mod 310 receives a reply identifying the wireless carrier of the mobile device. In this example, the mobile device retrieves the associated carrier from a subscriber identification module (SIM) card. Alternatively, the mobile device is registered with program 300 as a device using a particular wireless carrier. In that way, carrier mod 310 identifies the mobile device as being associated with the particular wireless carrier automatically and proceeds with the registered information.

Processing proceeds to step S265, where site mod 315 determines the geographic location of cell sites operated by the identified wireless carrier. In this embodiment, site mod 315 retrieves a set of geographic locations of cell sites from a database and stores a list of potential cell sites to be selected. For example, site mod 315 may retrieve the set of cell site locations from a publicly available database or cell cite map. In another example, site mod 315 may retrieve the locations of cell sites from an internal database maintained by the carrier.

Processing proceeds to step S270, where checkpoint mod 320 determines checkpoints along the navigation route. In this embodiment, checkpoint mod 320 determines intermediate "checkpoint" locations along the navigation route. That is, checkpoint mod 320 determines an expected location of the mobile device along the navigation route in timed increments, such as every 10 minutes. In this example, checkpoint mod 320 determines navigational coordinates of the checkpoints. Alternatively, checkpoint mod 320 may determine entry checkpoints and/or exit checkpoints for each cell along the navigation route.

Processing proceeds to step S275, where selection mod 325 selects a cell site for each checkpoint. In this embodiment, selection mod 325 determines which cell site will provide a better connection to the mobile device at a given checkpoint. Selection mod 325 assigns a score to each cell site based on weighted factors, and selection mod 325 selects a cell site based on the score. For example, selection mod 325 may assign weights based on distance to checkpoint, signal strength at a checkpoint, total network load, and/or historic data. According to some embodiments of the present invention, checkpoints are placed along the navigation route at sequential time periods, such as every 10 minutes. By placing a checkpoint where the mobile device will be located at the end of the sequential time periods based on the route information including navigation route and travel speed, the selection mod associates an identified cell site for each checkpoint.

In one example, selection mod 325 selects cell sites based on the distance between the checkpoint and the cell site. Selection mod 325 determines that a checkpoint is 1.1 miles from cell site A and 1.2 miles from cell site B. Selection mod 325 selects cell site A for the checkpoint based on the closer proximity between the checkpoint and cell site A.

In another example, selection mod 325 determines that cell site C and cell site D would both provide a quality signal to an individual mobile device, but selection mod 325 determines that cell site C is near full network capacity while cell side D is underutilized. Selection mod 325 selects cell site D based on the larger available bandwidth.

In another example, selection mod 325 determines that cell site E historically provides a quality signal for a particular area, while cell site F historically has a higher frequency of dropped calls. Selection mod 325 selects cell site E for checkpoints with the area based on the historic data.

In another example, selection mod 325 determines that cell site G historically has a higher frequency of dropped calls for southbound traffic, while cell site H historically provides a strong, stable signal. Selection mod 325 selects cell site H based on the historic data and a navigation route indicating a southbound travel direction.

In another example, selection mod 325 determines that cell site J and cell site K are potential cell sites for a checkpoint. Selection mod 325 determines that cell site J is 12 miles from the checkpoint and that cell site K is 27 miles from the checkpoint. Selection mod 325 assigns distance scores based on remaining range as a percentage of a theoretical maximum range of 45 miles. Selection mod 325 determines that the remaining range of cell site J is 33 miles, and selection mod 325 assigns cell site J a distance score of 0.73. Similarly, selection mod 325 assigns cell site K a distance score of 0.40.

Selection mod 325 determines that cell site J has historically provided an average signal strength of −87 dBm and that cell site K has historically provided an average signal strength of −92 dBm for devices located near the checkpoint. Based on a maximum signal strength of −60 dBm and a minimum signal strength of −110 dBm, selection mod 325 assigns signal strength scores of 0.46 and 0.36 to cell sites J and K, respectively.

Selection mod 325 determines that cell sites J and K each have a total bandwidth of 100 Mbit/s. Selection mod 325 determines that historically cell site J has a total network load of 60 Mbit/s and that cell site K has a total network load of 45 Mbit/s on the day of the week and time of arrival at the checkpoint. Selection mod 325 assigns a network load score based on the available bandwidth of each cell site. Selection mod 325 assigns a network load score of 0.40 to cell site J and a network load score of 0.55 to cell site K. Alternatively, selection mod 325 determines a network load score based on the total number of connected mobile devices.

Selection mod 325 applies weights to the distance, signal strength, and network load scores of each cell site to determine an overall score for each cell site. In this example, selection mod 325 applies weights of 0.50 to the distance score, 0.25 to the signal strength score, and 0.25 to the network load scores. Selection mod 325 determines an overall score of 0.58 for cell site J and an overall score of 0.43 for cell site K. Selection mod 325 selects cell site J based on the higher overall score.

Processing proceeds to step S280, where plan mod 330 generates a cell site handoff plan for the mobile device to be executed as it traverses the navigation route. In this embodiment, plan mod 330 generates a handoff plan describing times to handoff the mobile device from one cell site to the next cell site along the route. The handoff times are based on the estimated arrival time at each checkpoint. When a checkpoint has a different matched cell site from the previous checkpoint, plan mod 300 schedules a handoff between the cell sites at the estimated time of arrival at the checkpoint.

For example, cell site A is selected for checkpoint 1 of a route, and cell site B is selected for checkpoint 2. Based on the route information provided by the mobile device as it traverses the route, the mobile device will arrive at checkpoint 1 at 8:00 a.m. and will arrive at checkpoint 2 at 8:10 a.m. Plan mod 330 schedules a handoff between cell site A and cell site B for the mobile device at 8:10 a.m.

In this embodiment, plan mod 330 sends the handoff plan to the base station controller of each selected cell site. In some embodiments, plan mod 330 sends a partial plan to individual selected cell sites containing only the handoffs to and from the individual cell site. Alternatively, the handoff plan is passed along to each neighboring cell site while the mobile device is in transit, executing the handoff plan from one cell site to another while transmitting a current handoff plan along the way.

Processing proceeds to step S285, where update mod 335 updates the cell tower handoff plan responsive to changes in the navigation route. In this embodiment, update mod 335 monitors the activity of the mobile device for any changes in the planned route or the estimated time of arrival. When changes are identified, update mod 355 determines whether or not to update the handoff plan based on the changes. For example, responsive to receiving recalculated route information from the mobile device, update mod 335 determines cell tower site locations along the recalculated route, identifies corresponding checkpoints according to the recalculated route, updating existing checkpoints as needed, and determines an updated cell site handoff plan based on the recalculated route. Some embodiments of the present invention update the cell site handoff plan responsive to a detour, the user taking a break from traveling, and/or unexpected traffic patterns. Alternatively, processing may return to step S255 responsive to a change in route or destination.

III. Further Comments and/or Embodiments

Some embodiments of the present invention recognize the following facts, potential problems and/or potential areas for improvement with respect to the current state of the art: (i) failed handoff can result in dropped calls and/or lost data connection; (ii) networks rely on reported signal strength to select connected cell site; and/or (iii) networks react to reported signal strength to select cell site.

Some embodiments of the present invention provide proactive system to anticipate cell tower handoffs. In some embodiments of the present invention, a navigation route is shared with a connected cell tower. In some embodiments of the present invention, route data is overlaid with neighboring cell towers to optimize a tower transition plan.

Figure 4:
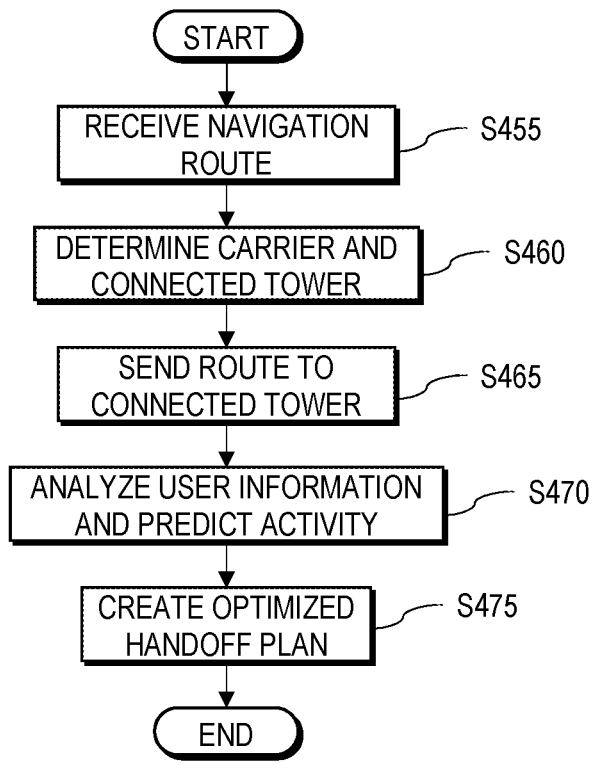
FIG. 4 is a flowchart showing a second embodiment method performed, at least in part, by the first embodiment system.
Figure 5:
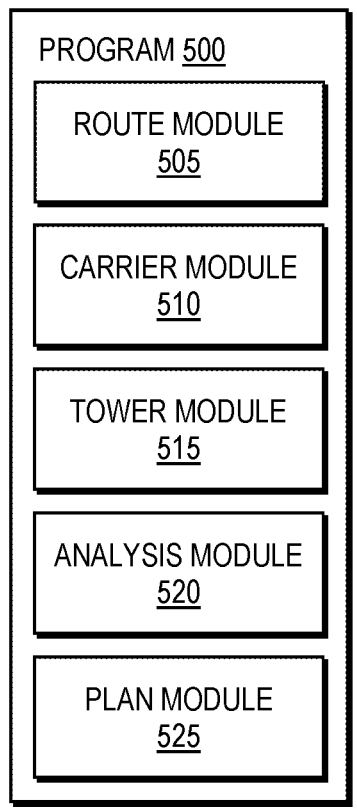
FIG. 5 is a block diagram view of a machine logic (for example, software) portion of the second embodiment system.

Further embodiments of the present invention are discussed in the paragraphs that follow with reference to FIGS. 4 and 5.

FIG. 4 shows flowchart 450 depicting a second method according to an embodiment of the present invention. FIG. 5 shows program 500 for performing at least some of the method steps of flowchart 450. This method and associated software will now be discussed, over the course of the following paragraphs, with extensive reference to FIG. 4 (for the method step blocks) and FIG. 5 (for the software blocks). Program 500 may be implemented on any operating system, for example: the operating system active on a partition, on the hardware management console, on a network switch, or on a storage controller.

Processing begins at step S455, where route mod 505 receives a navigation route from a mobile device. In this embodiment, a user enters a destination into navigation software on the mobile device and obtains a route. The route is shared with route mod 505. In some embodiment, route mod 505 may determine whether route sharing is enabled by the mobile device.

Processing proceeds to step S460, where carrier mod 510 determines the carrier of the mobile device and the connected cell tower. In this embodiment, carrier mod 510 queries the operating system (OS) of the mobile device to determine which carrier is associated with the device and which tower is currently connected to the device.

Processing proceeds to step S465, where tower mod 515 sends the route to the towers. In this embodiment, tower mod 515 sends the navigation route to the currently connected tower. In some embodiments, tower mod 515 sends the navigation route to a network switcher.

Processing proceeds to step S470, where analysis mod 520 analyzes user information and predicts activity. In this embodiment, analysis mod 520 analyzes the route information of all available users, analyzes the triangulated coordinates of each available user, analyzes the projected destination based on triangulation, and analyzes current activity and predicted activity.

Processing proceeds to step S475, where plan mod 525 creates an optimized handoff plan. In this embodiment, optimization mod 525 optimizes the handoff plan based on the analyzed user information, signal strength, signal quality, network capacity, network load, known location, and predicted locations of all available users.

Some embodiments of the present invention provide for the following example use. Tom is about to depart on a road trip with his family from New York City to Boston. Before departing, he enters the destination address into the navigation software of his vehicle. Tom has enabled sharing his route with his wireless provider, and the navigation software shares the route with the currently connected cell tower. A network control system determines an optimized cell tower handoff plan in anticipation of the trip by matching the estimated timing of the trip with certain characteristics the various cell towers to be encountered along the way. Tom shares his data connection with his family, enabling them to stream video during the trip. Because the network control system planned ahead for cell tower handoffs, the family is able to watch video content without any interruption while Tom drives to the destination address.

Some embodiments of the present invention provide for the following example use. Sue is preparing to take a high-speed train from Amsterdam to Paris. After boarding the train, Sue enters her destination train stop and her current location into mapping software on her mobile device. In this example, the mapping software determines the route of the train according to a known layout of train tracks. Sue enables sharing her route with her wireless communications provider. The mapping software shares her route with the wireless provider. A network control system determines and optimizes the cell towers that Sue will reach during her trip. The control system creates an optimized cell tower handoff plan. Alternatively, a pre-defined handoff plan is stored for access by the control system. The pre-defined handoff plan is based on regular train routes occurring throughout each day. For pre-defined handoff plans, the control system works from time of day, current location, and destination train stop to assign a pre-defined handoff plan to her mobile device. Some embodiments of the present invention are directed to pre-defined handoff plans that take into account reliability of certain towers, planned maintenance, and so forth to establish a handoff plan for a particular device. Regardless of how the handoff plan is determined, having assigned a proactive handoff plan predicting travel timing in view of nearby cell towers, Sue is able to work with her colleagues in the office using a web conference with a strong connection and no signal drops throughout her train ride.

Some embodiments of the present invention may include one, or more, of the following features, characteristics, and/or advantages: (i) anticipating cell tower handoffs; (ii) sending an estimated time of arrival from a mobile device to a cell tower; (iii) informing cell towers of travel plans and potential moves in or out of tower range; (iv) analyzing user's current activity and predicted activity, mobile device usage, data sync, phone sleep mode; (v) receive navigation from separate system not connected to mobile device; (vi) measuring received signal strength indication (RSSI) to select neighboring cell towers for handoff; and/or (vii) retrieving phone compatibility lists (PCL) to select neighboring cell towers for handoff.

Some embodiments of the present invention may include one, or more, of the following features, characteristics, and/or advantages: (i) proactive determination of cell sites; (ii) anticipation of cell tower handoffs (entry and exit events); (iii) sending an ETA from the car to the cell tower to inform the tower of travel plans and potential moves in or out of the towers range; and/or (iv) analyzing the user's current activity and predicted activity (cellular network usage, data sync, phone sleep mode, etc).

Some embodiments of the present invention may include one, or more, of the following features, characteristics, and/or advantages: (i) determination of entry and exit locations for cell tower coverage areas; (ii) determining optimal handoff locations; and/or (iii) determining arrival time at the handoff location.

Some embodiments of the present invention may include one, or more, of the following features, characteristics, and/or advantages: (i) adaptive scoring weights; (ii) scoring based on machine learning; and/or (iii) scoring based on neural network models.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Mobile device: a computing device capable of communicating over a wireless network, including phones, mobile phones, cell phones, and/or mobile broadband modem.

Cellular network: a network distributed over land areas called cells. Also known as cell network, mobile network, and/or wireless network.

Cell: a land area that is part of a cellular network, which is serviced by a cell site.

Cell site: transceiver (TRX) connecting user equipment (UE) to a cellular network. Also known as a base transceiver station (BTS). May be controlled by a base station controller via a base station control function (BCF). The BCF may provide an operations and maintenance (O&M) connection to the network management system (NMS).

Carrier: a provider of wireless communications services. Also known as a mobile network operator (MNO), wireless service provider, wireless carrier, cellular company, mobile network carrier.

Signal strength: a measurement of the power present in a received radio signal. May be measured in arbitrary strength units (ASU) or decibel-milliwatts (dBm). Specific measurements include received signal strength indicator (RSSI), received signal code power (RSCP, and reference signal received power (RSRP).

Range: distance a transceiver is able to send and receive signals. Also known as transmission range or broadcast range.

Handoff: a transition from one cell site to a neighboring cell site. Also known as a handover.

Dropped call: a loss of signal caused by a failed handoff.

Navigation route: a planned course between an origin and a destination. A navigation route may include driving segments, maneuvers, and/or an estimated time of arrival.

What is claimed is:

1. A method comprising:
receiving, by one or more processors, a navigation route from a mobile device, wherein the navigation route indicates an intended path of travel;
determining, by one or more processors, a carrier of the mobile device;
determining, by one or more processors, a set of checkpoints along the navigation route, wherein the set of checkpoints is based on an expected location of the mobile device at timed increments;
selecting, by one or more processors, a plurality of cell sites servicing the set of checkpoints, wherein the plurality of cell sites is associated with the carrier;
generating, by one or more processors, a cell site handoff plan based on the plurality of cell sites with a set of handoff times based on an estimated arrival time of the mobile device at each checkpoint of the set of checkpoints; and
sending, by one or more processors, the cell site handoff plan to a base station controller of each cell site of the plurality of cell sites.

2. The method of claim 1, wherein selecting the plurality of cell sites further comprises:
determining a set of potential cell sites within transmission range of the set of checkpoints;
determining a distance between the set of checkpoints and the potential cell sites;
determining an available bandwidth of the potential cell sites;
determining a historic signal quality of the set of potential cell sites; and
selecting the plurality of cell sites from the set of potential cell sites based on the distance, available bandwidth, and the historic signal quality.

3. The method of claim 1, further comprising:
sending the cell site handoff plan to a network controller, wherein the network controller controls handoffs between cell sites.

4. The method of claim 1, further comprising:
generating a plurality of partial cell site handoff plans corresponding to the plurality of cell sites; and
sending the plurality of cell site handoff plans to the plurality of cell sites.

5. The method of claim 1, further comprising:
sending the cell site handoff plan to a first cell site of the plurality of cell sites;
executing a cell site handoff from the first cell site to a second cell site of the plurality of cell sites; and
sending the cell site handoff plan to the second cell site.

6. The method of claim 1, further comprises:
monitoring, by one or more processors, the mobile device for changes in the estimated arrival time of the mobile device at at least one checkpoint of the set of checkpoints.

7. A computer program product comprising:
one or more computer readable storage media and program instructions stored on the one or more computer readable storage media, the program instructions comprising:
program instructions to receive a navigation route from a mobile device, wherein the navigation route indicates an intended path of travel;
program instructions to determine a carrier of the mobile device;
program instructions to determine a set of checkpoints along the navigation route, wherein the set of checkpoints is based on an expected location of the mobile device at timed increments;
program instructions to select a plurality of cell sites servicing the set of checkpoints, wherein the plurality of cell sites is associated with the carrier;
program instructions to generate a cell site handoff plan based on the plurality of cell sites with a set of handoff times based on an estimated arrival time of the mobile device at each checkpoint of the set of checkpoints; and
program instructions to send the cell site handoff plan to a base station controller of each cell site of the plurality of cell sites.

8. The computer program product of claim 7, wherein the program instructions to select the plurality of cell sites further comprises:
program instructions to determine a set of potential cell sites within transmission range of the set of checkpoints;
program instructions to determine a distance between the set of checkpoints and the potential cell sites;
program instructions to determine an available bandwidth of the potential cell sites;
program instructions to determine a historic signal quality of the set of potential cell sites; and
program instructions to select the plurality of cell sites from the set of potential cell sites based on the distance, available bandwidth, and the historic signal quality.

9. The computer program product of claim 7, further comprising:
program instructions to send the cell site handoff plan to a network controller, wherein the network controller controls handoffs between cell sites.

10. The computer program product of claim 7, further comprising:
program instructions to generate a plurality of partial cell site handoff plans corresponding to the plurality of cell sites; and
program instructions to send the plurality of cell site handoff plans to the plurality of cell sites.

11. The computer program product of claim 7, further comprising:
program instructions to send the cell site handoff plan to a first cell site of the plurality of cell sites;
program instructions to execute a cell site handoff from the first cell site to a second cell site of the plurality of cell sites; and
program instructions to send the cell site handoff plan to the second cell site.

12. The computer program product of claim 7, further comprises:
program instructions to monitor the mobile device for changes in the estimated arrival time of the mobile device at at least one checkpoint of the set of checkpoints.

13. A computer system comprising:
one or more computer hardware processors, one or more computer readable storage devices, and program instructions stored on the one or more computer readable storage devices for execution by at least one of the one or more hardware processors, the program instructions comprising:
program instructions to receive a navigation route from a mobile device, wherein the navigation route indicates an intended path of travel;
program instructions to determine a carrier of the mobile device;
program instructions to determine a set of checkpoints along the navigation route, wherein the set of checkpoints is based on an expected location of the mobile device at timed increments;
program instructions to select a plurality of cell sites servicing the set of checkpoints, wherein the plurality of cell sites is associated with the carrier;
program instructions to generate a cell site handoff plan based on the plurality of cell sites with a set of handoff times based on an estimated arrival time of the mobile device at each checkpoint of the set of checkpoints; and
program instructions to send the cell site handoff plan to a base station controller of each cell site of the plurality of cell sites.

14. The computer system of claim 13, wherein the program instructions to select the plurality of cell sites further comprises:
program instructions to determine a set of potential cell sites within transmission range of the set of checkpoints;
program instructions to determine a distance between the set of checkpoints and the potential cell sites;
program instructions to determine an available bandwidth of the potential cell sites;
program instructions to determine a historic signal quality of the set of potential cell sites; and
program instructions to select the plurality of cell sites from the set of potential cell sites based on the distance, available bandwidth, and the historic signal quality.

15. The computer system of claim 13, further comprising:
program instructions to send the cell site handoff plan to a network controller, wherein the network controller controls handoffs between cell sites.

16. The computer system of claim 13, further comprising:
program instructions to generate a plurality of partial cell site handoff plans corresponding to the plurality of cell sites; and
program instructions to send the plurality of cell site handoff plans to the plurality of cell sites.

17. The computer system of claim 13, further comprising:
program instructions to send the cell site handoff plan to a first cell site of the plurality of cell sites;

program instructions to execute a cell site handoff from the first cell site to a second cell site of the plurality of cell sites; and program instructions to send the cell site handoff plan to the second cell site.

18. The computer system of claim 13, further comprises:

program instructions to monitor the mobile device for changes in the estimated arrival time of the mobile device at at least one checkpoint of the set of checkpoints.

* * * * *